3,053,863
16-OXYGENATED ANDROSTANE, 5-ANDROSTENE AND 1,3,5(10)-ESTRATRIENE ESTERS
Max N. Huffman, Oklahoma City, Okla., assignor to Lasdon Foundation, Inc., Nepera Park, Yonkers, N.Y., a corporation of Delaware
No Drawing. Filed Sept. 6, 1957, Ser. No. 682,300
5 Claims. (Cl. 260—397.5)

This invention relates to steroid esters and the production thereof. More particularly it relates to compounds of the general formula

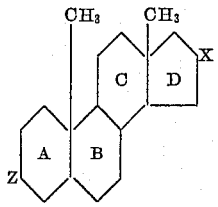

wherein X and Z are members of the group consisting of hydroxyl, oxo and HOOCRCOO— radicals, wherein at least one of the radicals X and Z is an HOOCRCOO— radical, the R radical of the HOOCRCOO— radical being a bi-valent aliphatic hydrocarbon radical containing from 2 to 8 carbon atoms, and wherein the steroid nucleus may contain one or more double bonds in rings A and B.

In the formula given above, the rings A and B of the steroid nucleus may be saturated or unsaturated. For instance, they may contain a double bond at the 5–6 position, in which case the compound is a 5-androsten compound. Ring A may contain a conjugated series of three double bonds whereupon the substance is a 1,3,5(10)-estratriene compound without the methyl radical in the 10-position. If the nucleus is saturated, the steroid is an androstane compound.

The hydroxy steroids from which the compounds of this invention are produced bear certain structural relationships to some of the sex hormones such as androsterone and estrone, but these hydroxy steroids are significantly different from the sex hormones and do not exhibit the androgenic and estrogenic properties of such hormones. They are, in contrast, hypotensive and tranquilizing agents and competitive inhibitors of the sex hormones, as disclosed in Huffman Patents Nos. 2,705,239, 2,759,952 and 2,779,773 and Huffman applications Serial Nos. 501,210, 532,111, now abandoned, and 662,804, now Patent No. 2,963,493. These desirable properties are also exhibited by the esters which comprise this invention and these esters are valuable medicinal agents.

All of the substances of this invention have the further desirable property of being readily soluble in aqueous alkaline solutions and can be converted into water-soluble salts which are useful for oral and parenteral administration. These water-soluble properties are not exhibited by the parent steroids so that the esters of this application have further desirable properties not shown by substances heretofore known.

It is an object of this invention to provide new steroid compounds of the androstan, androsten and estratriene series. It is another object of this invention to provide methods of producing such compounds efficiently from available sources of steroids. It is a further object of the invention to provide new and useful steroid esters which exhibit desirable physiological properties and which are available in water-soluble form.

These and other objects will be apparent from and are achieved in accordance with the following description of the invention. Broadly the substances of this invention are produced from the corresponding hydroxyl-containing steroids by esterification of such steroids with an anhydride or acid halide of a dibasic aliphatic acid of the formula HOO—R—COOH wherein the radical R is a bi-valent aliphatic hydrocarbon radical containing at least 2 and generally not more than 8 carbon atoms. The esterification reaction is preferably carried out in a tertiary organic amine having relatively high boiling point, that is, in the range of 100° to 150° C. and being water-miscible. Among such solvents are quinoline, pyridine, dimethylaniline and similar tertiary organic amines. The esterification is carried out at a temperature in the range of 80–150° C. in a period of a few minutes to a few hours. After the esterification has been completed the ester may be isolated from the reaction mixture by dilution with water which causes precipitation of the ester in certain cases and, optionally, by extraction with a water-immiscible organic solvent in which the ester is soluble. Among such solvents are aliphatic ethers such as diethyl ether, chloroform, benzene and related substances. The esters are acidic in nature and can be isolated from solution in the organic solvents by extraction with dilute aqueous alkaline solutions such as dilute sodium carbonate, dilute potassium carbonate or dilute sodium hydroxide solution in which the acidic esters are soluble. The esters may then be isolated from the aqueous alkali media by treatment with acid whereupon the acid esters of the steroids precipitate, generally in crystalline form, and may be separated and purified by conventional procedures, such as crystallization from aqueous acetone or mixtures of acetone and hydrocarbons.

In the compounds of the type described above, the dibasic acids which form the radical HOOCRCOO— include the well known dibasic acids, such as succinic, maleic, glutaric, adipic, pimelic, suberic, azelaic and sebacic acids, which contain 2 to 8 carbon atoms in the bivalent hydrocarbon moiety. These acids are generally available in the form of their anhydrides and may be used in producing the esters of this invention by the procedure described above.

The invention is disclosed in further detail by the following examples which are provided for the purpose of illustration only and are not intended to limit the invention. Relative quantities of materials are given in grams and milligrams (mg.), volumes are presented in milliliters (ml.), while temperatures are recorded in degrees centigrade. It will be apparent to those skilled in the art that numerous modifications in quantities, temperatures and other conditions, as well as in equivalent substances, may be made without departing from this invention.

*Example 1*

One gram of 5-androsten-3 beta-ol-16-one was dissolved in 20 ml. of dry pyridine and 1.4 grams of succinic anhydride were added. The mixture was heated at 90–100° C. for 2.5 hours while protected from atmospheric moisture. Then 50 ml. of water were added and the heating continued for 30 minutes. The mixture was then cooled and allowed to stand at room temperature over night. It was diluted with 100 ml. of saturated sodium chloride solution and extracted three times with a total of 800 ml. of ether. The ether extract was washed with dilute hydrochloric acid and with water and then extracted with 500 ml. of 0.1 normal potassium carbonate solution. The potassium carbonate extract was immediately acidified and allowed to stand for four hours. The precipitate of 5-androsten-3 beta-ol-16-one hydrogen succinate was collected on a filter, washed and dried. After recrystallization from aqueous acetone the product melted at 187–188° C. On further recrystallization from a mixture of acetone and petroleum ether there was obtained 600 mg. of 5-androsten-3 beta-ol-16-one hydrogen succinate melting at 187.5–188.5° C.

*Example 2*

A mixture of 480 mg. of 5-androsten-3 beta,16 beta-diol, 1.5 grams of succinic anhydride and 10 ml. of pyridine was heated at 90–100° C. for 2.5 hours while protected from atmospheric moisture. The solution was then diluted with 25 ml. of water and heated at 90–100° C. for 30 minutes. The reaction mixture was cooled to room temperature and diluted with 250 ml. of ice water. The mixture was allowed to stand at ice temperature for three hours during which time an oily precipitate formed. The reaction mixture was saturated with sodium chloride and extracted twice with a total of 500 ml. of ether. The ether extracts were combined, washed with 2 normal hydrochloric acid and with water. The ether solution was then extracted twice with 250-ml. portions of 0.1 normal potassium carbonate solution containing 5% sodium chloride. The potassium carbonate extract was acidified slowly with concentrated hydrochloric acid and allowed to stand at room temperature for one-half hour. The precipitate of 5-androsten-3 beta,16 beta-diol bis-(hydrogen succinate) was collected on a filter, washed with water and dried, yielding 1.23 grams of product melting at 153–155° C. After recrystallization from dilute aqueous acetone and a mixture of acetone and petroleum ether, the product melted at 163–163.5° C.

*Example 3*

A solution of 435 mg. of 5-androsten-3 beta,16 alpha-diol and 1.5 grams of succinic anhydride in 10 ml. of dry pyridine was heated at 90–100° C. for 2.5 hours. The reaction mixture was diluted with 25 ml. of cold water and heated for 30 minutes longer. The reaction mixture was cooled and diluted with 200 ml. of ice water saturated with sodium chloride and extracted twice with 200-ml. portions of ether. The ether extracts were combined and washed with ice water, with 2 normal hydrochloric acid and again with ice water. The ether extracts were then extracted twice with 250-ml. portions of 0.1 normal potassium carbonate solution containing 5% sodium chloride. The combined potassium carbonate extracts were acidified with hydrochloric acid and allowed to stand for 30 minutes during which time a precipitate of 5-androsten-3 beta, 16 alpha-diol bis-(hydrogen succinate) formed. The yield of product was 630 mg. After recrystallization from aqueous acetone and from a mixture of acetone and petroleum ether, the product melted at 153–154.5° C.

*Example 4*

A mixture of 500 mg. of androstan-3 beta,16 beta-diol, 1.5 grams of succinic anhydride and 12 ml. of dry pyridine was heated at 95–100° C. for 2.5 hours while protected from atmospheric moisture. Then 25 ml. of water were added and the mixture heated for 30 minutes longer. The reaction mixture was cooled to room temperature and diluted with 250 ml. of ice water. A precipitate of oily material formed. The mixture was saturated with sodium chloride and extracted twice with 300-ml. portions of ether. The combined ethereal extracts were washed with 2 normal hydrochloric acid and with water and then extracted with 0.1 normal potassium carbonate solution in two 250-ml. portions. The combined alkaline extracts were acidified with concentrated hydrochloric acid and allowed to stand at room temperature for two hours. The precipitate of androstan-3 beta,16 beta-diol bis-(hydrogen succinate) was collected on a filter and dried. The product weighed 790 mg. and melted at 165–165.5° C. After recrystallization from aqueous acetone (50%) the product melted at 175.5–176° C.

*Example 5*

About 300 mg. of androstan-16 beta-ol-3-one were dissolved in 8 ml. of dry pyridine and treated with 2.0 grams of succinic anhydride. The mixture was heated at about 100° C. for two hours with occasional swirling while protected from atmospheric moisture. Then 40 ml. of water were added and the mixture heated at about 100° C. for 30 minutes with occasional agitation. The reaction mixture was cooled and extracted with 400 ml. of ether. The ether layer was separated, washed with dilute acid, with water and then with three 300-ml. portions of 0.1 normal potassium carbonate solution containing 5% sodium chloride. The combined carbonate solutions containing the androstan-16 beta-ol-3-one hydrogen succinate were treated with concentrated hydrochloric acid to precipitate the steroid. The androstan-16 beta-ol-3-one hydrogen succinate was collected on a filter, washed with water and dried.

*Example 6*

A mixture of 3.52 grams of estradiol-3,16 beta, 4.9 grams of succinic anhydride and 70 ml. of dry pyridine was heated for 2.5 hours at steam temperature while protected from atmospheric moisture. It was then diluted with 100 ml. of water and heating continued for one-half hour. The mixture was cooled and diluted with 3 liters of ice water. The mixture was extracted twice with a total of 1500 ml. of ether and the combined ethereal extracts were washed with dilute acid and with water. The ethereal solution was then extracted with 2500 ml. of 0.1 normal potassium carbonate solution and again with 500 ml. of 0.1 normal potassium carbonate solution. The combined alkaline extracts were neutralized with concentrated hydrochloric acid to a pH of 4. Upon standing a precipitate of estradiol-3,16 beta-16-hydrogen succinate was formed weighing 3.31 grams and melting at 149–150° C. Upon recrystallization from a mixture of acetone and petroleum ether, the product was obtained in the form of crystals melting at 167.5–168.5° C.

*Example 7*

To 400 mg. of 5-androsten-3 beta-ol-16-one hydrogen succinate dissolved in 125 ml. of 0.1 normal potassium carbonate solution was added 1.2 grams of sodium borohydride in 25 ml. of 0.1 normal potassium carbonate solution. The reaction mixture was allowed to stand for 15 minutes at room temperature, then 5 ml. of acetone and an excess of ice were added. After standing 5 minutes, the solution was washed with 500 ml. of ether and then acidified with concentrated hydrochloric acid. A precipitate of 5-androsten-3 beta,16 beta-diol-3-hydrogen succinate formed and was removed by filtration after an hour. This compound was recrystallized from aqueous acetone with the aid of activated charcoal and a yield of 300 mg. melting at 172–172.5° C. was obtained. On further recrystallization from a mixture of acetone and petroleum ether, the 5-androsten-3 beta,16 beta-diol-3-hydrogen succinate melted at 172.5–173° C.

*Example 8*

To a solution of 500 mg. of androstan-3 beta-ol-16-one in 10 ml. of dry pyridine was added 700 mg. of succinic anhydride. The mixture was heated at 95–100° C. for 2 hours while protected from moisture. Then 30 ml. of water were added and the heating continued for 30 minutes. The mixture was cooled and allowed to stand over night at room temperature. It was diluted with 55 ml. of saturated sodium chloride solution and extracted three times with a total of 400 ml. of ether. The combined ether extract was washed with dilute hydrochloric acid and with water and extracted with 250 ml. of 0.1 normal potassium carbonate solution. The potassium carbonate extract was immediately acidified and allowed to stand for four hours. The precipitate of androstan-3 beta-ol-16-one hydrogen succinate was removed by filtration, washed and dried.

To a solution of 200 mg. of androstan-3 beta-ol-16-one hydrogen succinate in 65 ml. of 0.1 normal potassium carbonate solution was added 0.6 gram of sodium borohydride in 15 ml. of 0.1 normal potassium carbonate solution. The reaction mixture was kept at room temperature for 15 minutes, then diluted with ice water containing 3 ml. of acetone. After standing 5 minutes the solution was washed with 250 ml. of ether and acidified with concentrated hydrochloric acid, causing the precipitation of androstan-3 beta, 16 beta-diol-3-hydrogen succinate. After an hour the precipitate was collected on a filter, washed with water and dried. The androstan-3 beta,16 beta-diol-3-hydrogen succinate can be further purified by recrystallization from a mixture of acetone and petroleum ether.

What is claimed as new and is desired to be secured by Letters Patent of the United States is:

1. 5-androsten-3 beta,16 alpha-diol bis-(hydrogen succinate).
2. 5-androsten-3 beta,16 beta-diol-bis-(hydrogen succinate).
3. 5-androsten-3 beta,16 beta-diol-3-hydrogen succinate.
4. Androstan-3 beta,16 beta-diol-3-hydrogen succinate.
5. A steroid ester of the formula

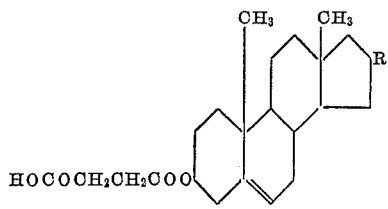

wherein R is a member of the group consisting of hydroxyl and —OCOCH$_2$CH$_2$COOH radicals.

References Cited in the file of this patent
UNITED STATES PATENTS

| | | |
|---|---|---|
| 2,192,935 | Schoeller | Mar. 12, 1940 |
| 2,705,239 | Huffman | Mar. 29, 1955 |
| 2,756,244 | Djerassi | July 24, 1956 |
| 2,759,952 | Huffman | Aug. 11, 1956 |
| 2,771,467 | Magerlein | Nov. 20, 1956 |
| 2,773,886 | Velluz | Dec. 11, 1956 |
| 2,779,773 | Huffman | Jan. 29, 1957 |
| 2,843,608 | Colton | July 15, 1958 |
| 2,860,147 | Huffman | Nov. 11, 1958 |

OTHER REFERENCES

Collection of Czechoslov. Chem. Communs., vol. 19, 349–56 (1954), Fajkos et al. or Chem. Abstracts, vol. 49, 1955, paragraphs 357$h$ and paragraphs 357$i$ relied on.